(12) United States Patent
Tanaka

(10) Patent No.: US 6,172,435 B1
(45) Date of Patent: Jan. 9, 2001

(54) FLYWHEEL POWER SOURCE DEVICE

(75) Inventor: Kazuhiko Tanaka, Kani (JP)

(73) Assignee: Nippon Furai Hoile KK (JP)

( * ) Notice: Under 35 U.S.C. 154(b), the term of this patent shall be extended for 0 days.

(21) Appl. No.: 09/422,326

(22) Filed: Oct. 21, 1999

(51) Int. Cl.[7] ................................................... H02K 7/02
(52) U.S. Cl. ........................... 310/74; 310/90; 310/75 D; 310/103
(58) Field of Search .............. 310/74, 90, 90.5, 310/75 D, 103

(56) References Cited

U.S. PATENT DOCUMENTS

| | | | |
|---|---|---|---|
| 5,065,060 | * 11/1991 | Takahashi et al. | 310/74 |
| 5,126,610 | * 6/1992 | Fremery | 310/90.5 |
| 5,789,837 | * 8/1998 | Shin et al. | 310/90.5 |
| 5,838,082 | * 11/1998 | Ito et al. | 310/90.5 |
| 5,923,109 | * 7/1999 | Higuchi et al. | 310/90.5 |

FOREIGN PATENT DOCUMENTS

| | | |
|---|---|---|
| 60-141144 | 7/1985 | (JP) . |
| 7-322533 | 12/1995 | (JP) . |

\* cited by examiner

Primary Examiner—Nestor Ramirez
Assistant Examiner—Thanh Lam
(74) Attorney, Agent, or Firm—Finnegan, Henderson, Farabow, Garrett & Dunner

(57) ABSTRACT

A flywheel power source device for converting electric energy into kinetic energy and for storing the kinetic energy by rotating a flywheel of which rotary shaft is rotatably supported by a bearing mounted in a casing at high speed, wherein the kinetic energy is reconverted into electric energy when necessary; the flywheel power source device is provided with a rotational fulcrum at a bottom of the rotary shaft and a center of gravity of the flywheel being positioned on a line of action of a resultant force of magnetic attractive forces acting on the flywheel.

4 Claims, 2 Drawing Sheets

FLYWHEEL POWER SOURCE DEVICE

BACKGROUND OF THE INVENTION

1. Field of the Invention

The present invention relates to a flywheel power source device which stores kinetic energy by rotating a flywheel at high speed and reconverts the stored kinetic energy of the flywheel to electric energy when necessary.

2. Description of the Related Art

The present applicant has applied a flywheel power source device A which eliminates work of precise leveling when it is installed and is highly resistant to lateral swing (Japanese Patent Application Unexamined Publication No. HEI 7(1995)-322533). This flywheel power source device A (hereinafter referred to as a conventional device A) will be described with reference to FIG. 2.

A flywheel B has a main body part C shaped like an inverted cup and a rotary shaft D provided at the center of the main body part C, the bottom end of the rotary shaft D being rotatably fitted in a pivot bearing F provided on a casing E and the central top of the flywheel B being rotatably fitted on a bearing H provided on the casing E. The bearing H has a structure in which a circular recessed part J of the flywheel B is fitted on a short shaft I of the casing E side, wherein there is a small gap between the short shaft I (to be exact, a ball bearing Ix) and the circular recessed part J.

The flywheel B is provided with a rotor M having an iron core K which is mounted on the inner peripheral surface of the main body part C and is sandwiched by end rings L, L. On the other hand, a stator P is mounted on a bottom wall N of the casing E in such a way that it is opposed to the rotor M of the flywheel B. The stator P includes a fixed base part Q projected from the bottom wall N, an iron core R mounted around the base part Q, and a coil S.

In the conventional device A described above, if voltage is applied to the coil S of the stator P by an external power source, a rotational force is generated by magnetic action caused on the same principle as that of an electric motor to rotate the flywheel B. By rotating the flywheel B at high speed, electric energy is converted to kinetic energy and is stored as the kinetic energy. In this respect, while the flywheel B is being rotated, it is rotated like a top on one point of the pivot bearing F and the circular recessed part J is not in contact with the short shaft I, which significantly reduces the mechanical loss of the flywheel B. Next, when power supply to the coil S is stopped owing to power failure or the like, the kinetic energy of the flywheel B is reconverted to the electric energy on the same principle as a generator and the electric energy is supplied to the external load.

That is to say, in the above-mentioned conventional device A, the rotational fulcrum at the bottom end of the rotary shaft D is aligned with the center of gravity G of the flywheel B, so as to prevent the precession of the flywheel B. (The precession means that the upper end of the rotary shaft D swings along arcs around the rotational center at the bottom end of the rotary shaft D on the principle of a top.) In this regard, if the flywheel B starts the precession, the circular recessed part J is brought into contact with the ball bearing Ix of the short shaft I to increase the mechanical loss, which aggravates efficiency, shortens its life and makes noises while being operated. As the result, the performance of the flywheel power source device is substantially reduced.

The above-mentioned conventional device A is stable in a state in which the flywheel B rotates at high speed and does not start the precession even if it is placed on a slant position or it is swung laterally, and hence solves almost all the problems caused by the precession of the flywheel B. However, it has been found that under special conditions, that is, when the flywheel B in a stop state is started by large voltage, the flywheel B starts the precession and the rotary shaft D is held inclined (the circular recessed part J is held in contact with the ball bearing Ix of the short shaft I) and cannot be returned to the original state. Yet, even in the conventional device A, if the number of revolutions of the flywheel B is gradually increased by applying reduced voltage thereto, the above-mentioned problems do not arise.

In order to find the cause of the problem described above, the conventional device A has been analyzed and it has been found that, as shown in FIG. 2, there was a deviation Z between the center line X of the iron core K of the rotor M on the flywheel B side or the center line Y of the iron core R of the stator P on the casing E side (the center line Y and the center line X usually overlap one another.) and the rotational fulcrum at the bottom end of the rotary shaft D. The deviation Z generates force for inclining the flywheel B around the rotational fulcrum under the special conditions described above.

That is, when the flywheel B is rotated, magnetic attractive forces are applied to the iron cores K, R and it is considered that the resultant force of the magnetic attractive forces is applied to the center lines X, Y of the iron cores K, R. If there is a deviation Z between the center lines X, Y of the iron cores K, R and the rotational fulcrum of the flywheel B, as described above, moment in the direction inclining the flywheel B around the rotational fulcrum acts on the flywheel B in proportion to the magnitude of the magnetic attractive force and the magnitude of the deviation Z. Since the magnetic attractive forces of the iron cores K, R increase in proportion to voltage, when the flywheel B is started by large voltage, the effect of the moment acting on the flywheel B increases. As the result, the flywheel B is being rotated as it is inclined.

SUMMARY OF THE INVENTION

The present invention has been made in view of the above circumstances and has an object to overcome the above problems and to provide a flywheel power source device for converting electric energy into kinetic energy and for storing the kinetic energy by rotating a flywheel of which rotary shaft is rotatably supported by a bearing mounted in a casing at high speed, wherein the kinetic energy is reconverted into electric energy when necessary; the flywheel power source device is provided with a rotational fulcrum at a bottom of the rotary shaft and a center of gravity of the flywheel being positioned on a line of action of a resultant force of magnetic attractive forces acting on the flywheel.

Since the rotational fulcrum at the bottom end of the rotary shaft and the center of gravity of the flywheel are positioned on the line of action of the resultant force of magnetic attractive forces acting on the flywheel, even if the magnetic attractive forces, when the flywheel is rotated, is large, moment inclining the flywheel is not produced. Therefore, when the flywheel starts to be rotated by large voltage, the flywheel does not produce precession.

As described above, in the flywheel power source device in accordance with the present invention, the rotational fulcrum of the rotary shaft and the center of gravity of the flywheel are positioned on the line of action of the resultant force of magnetic attractive forces acting on the flywheel when the flywheel is rotated, and hence even if the magnetic forces act on the flywheel, moment inclining the flywheel is not produced. Therefore, even if the flywheel in a stop state starts to be rotated by large voltage, the flywheel rotates in a normal position and does not produce the precession.

In this respect, in the flywheel power source device of this present invention a center line of an iron core of a rotator mounted on a side of the flywheel is aligned on a center line of an iron core of a stator mounted on a side of the casing, and rotational fulcrum of the rotary shaft and the center of gravity of the flywheel are positioned on said center line.

If the center line of the iron core of a rotor mounted on a flywheel side is aligned with the center line of the iron core of a stator mounted on a casing side and further the rotational fulcrum of the rotary shaft and the center of gravity of the flywheel are aligned with the center lines, then the rotational fulcrum of the rotary shaft and the center of gravity of the flywheel can easily be positioned on the line of action of the resultant force of the magnetic attractive forces acting on the flywheel.

Additional objects and advantages of the invention will be set forth in part in the description which follows and in part will be obvious from the description, or may be learned by practice of the invention. The objects and advantage of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification illustrated an embodiment of the invention and together with description, serve to explain the objects, advantages and principles of the invention. In the drawings.

DETAILED DESCRIPTION OF THE PREFERRED EMBODIMENTS

A detailed description of one preferred embodiment of a flywheel power source device embodying the present invention will now be given referring to the accompanying drawings.

Figure 1:
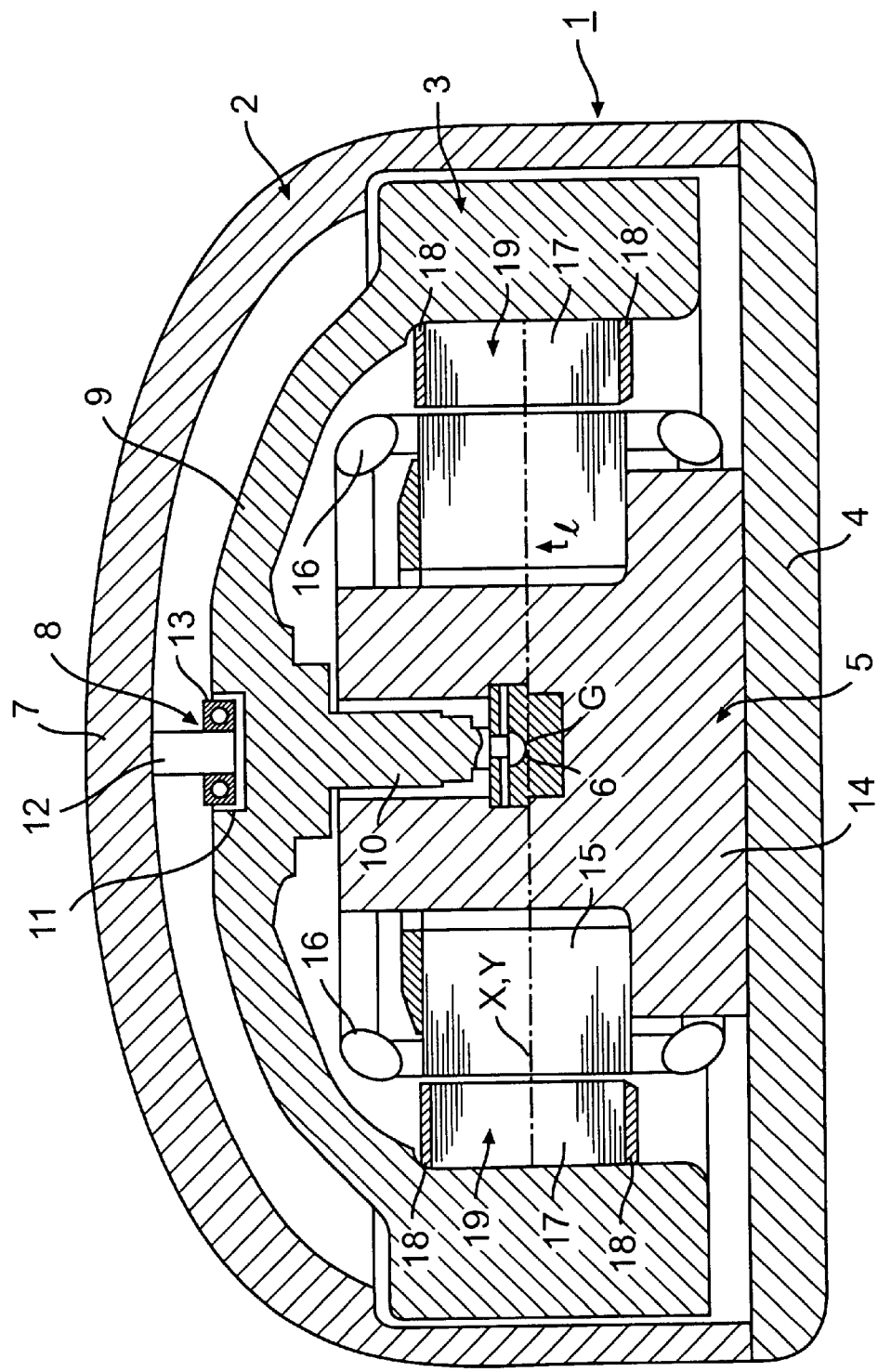
FIG. 1 is a longitudinal cross-sectional view of a flywheel power source device in accordance with the present invention.
Figure 2:
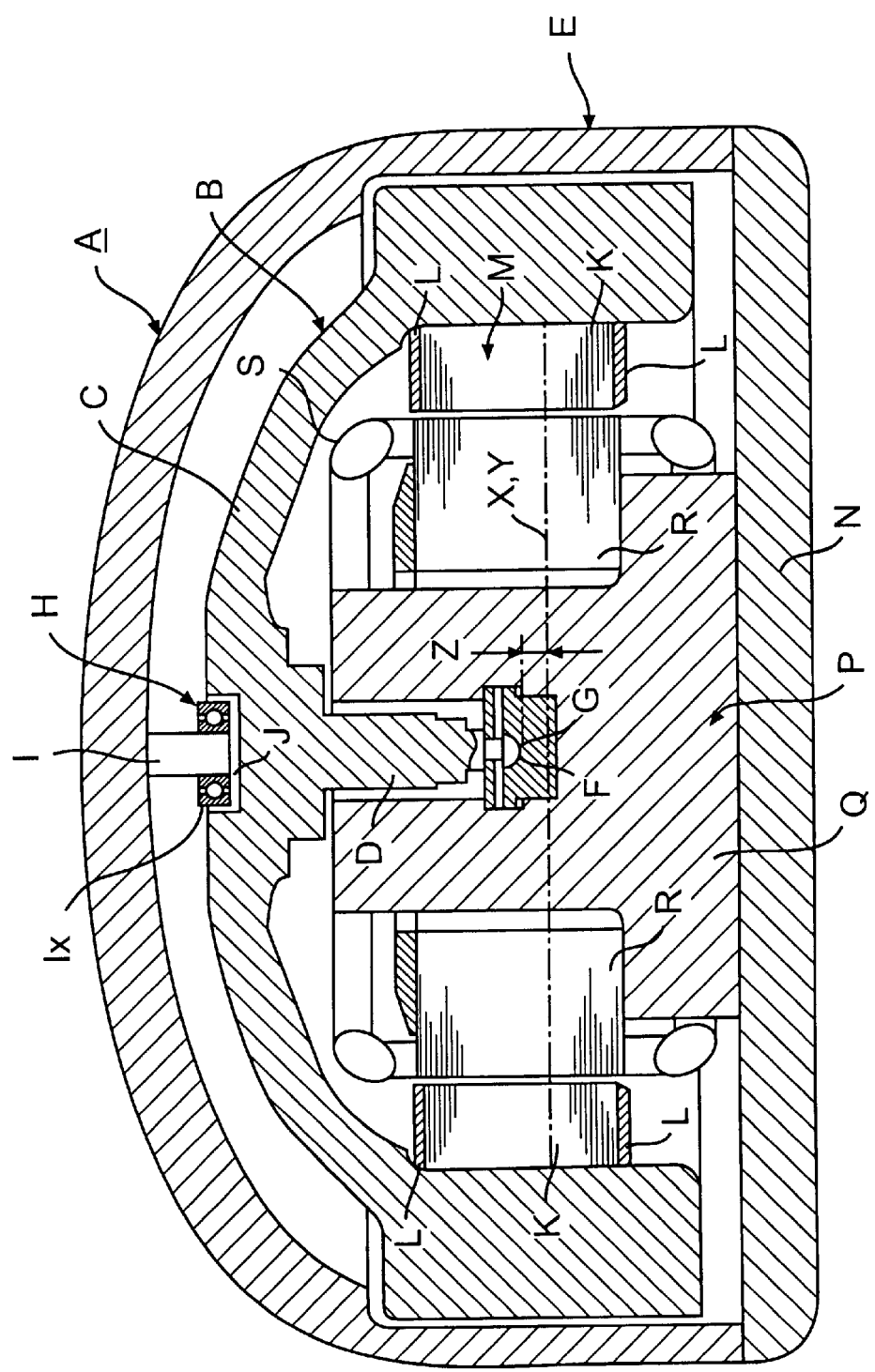
FIG. 2 is a longitudinal cross-sectional view of a conventional flywheel power source device.

FIG. 1 is a longitudinal cross-sectional view of the flywheel power source device in accordance with the present invention.

The flywheel power source device 1 has a combined structure of a hermetically closed casing 2 and a flywheel 3. The casing 2 is provided with a stator 5 fixed to a bottom wall 4, a pivot bearing 6 at the center of the stator 5, and a touch-down bearing 8 mounted to the center of the surface of a ceiling part 7. On the other hand, the flywheel 3 is shaped like a top which includes a main body part 9 shaped like a nearly inverted cup and a rotary shaft 10 mounted at the center of the main body part 9, wherein the bottom end of the rotary shaft 10 is rotatably fitted in the pivot bearing 6 of the casing 2 and the circular recessed part 11 of the central top part of the flywheel 3 is rotatably fitted on the touch-down bearing 8.

The above pivot bearing 6 functions as a rotational fulcrum of the flywheel 3 and is a well-known bearing for floating the bottom end of the rotary shaft 10 with lubricating oil. Also, the touch-down bearing 8 is a bearing of the type having a ball bearing 13, which is mounted to a short shaft 12 integrally fixed to the casing 2 and is loosely fitted in the circular recessed part 11 of the flywheel 3, that is, a bearing of an outer-ring-rotating type. Since the touch-down bearing 8 is a bearing of the outer-ring-rotating type described above, it can reduce the rotational resistance of the flywheel 3. That is, in the touch-down bearing 8 of the outer-ring-rotating type, when the upper part of the flywheel 3 swings and puts the circular recessed part 11 into contact with the ball bearing 13 of the short shaft 12, a force in the direction separating the circular recessed part 11 from the ball bearing 13 is applied to the flywheel 3 to reduce a contact pressure and to return to a normal non-contact state immediately.

The stator 5 has an iron core 15 and a coil 16 around a fixed base part 14, and the above-mentioned pivot bearing 6 is nearly at the center of the base part 14. In FIG. 1, the center line Y in the height direction of the iron core 15 of the stator 5 (in the direction of the rotary shaft 10) passes the rotational fulcrum (pivot bearing 6) at the bottom end of the rotary shaft 10.

The flywheel 3 has a squirrel-cage rotor 19 constituted by an iron core 17 and end rings 18, 18 sandwiching the iron core 17 and mounted to the inner peripheral surface of the main body part 9. The balance of the flywheel 3 is set such that the center of gravity G is positioned at the rotational fulcrum (pivot bearing 6) at the bottom end of the rotary shaft 10 in a state in which the rotor 19 is mounted to the flywheel 3. Also, the center line X in the height direction of the iron core 17 of the rotor 19 (in the direction of the rotary shaft 10) passes the rotational fulcrum (pivot bearing 6) at the bottom end of the rotary shaft 10.

The flywheel power source device 1 is constituted in the above manner, and hence if voltage is applied to the coil 16 of the stator 5 by an external power source, a rotational force is applied to the rotor 19 on the same principle as that of an electric motor. The flywheel 3 is rotated at a rotational speed of about 10,000 rpm to store electric energy in a state in which the electric energy is converted into kinetic energy. When power supply to the coil 16 is stopped in this state owing to a power failure or the like, the kinetic energy of the flywheel 3 is reconverted into the electric energy on the same principle as a generator, and the electric energy is supplied to an external load. In this respect, when voltage is applied again to the coil 16 of the stator 5 by the external power source, the flywheel 3 is rotated on the same principle as that of the electric motor and returns to high speed rotation of about 10,000 rpm stores the kinetic energy.

As described above, in the flywheel power source device 1 in accordance with the present invention, the balance of the flywheel 3 is set such that the center of gravity is positioned on the rotational fulcrum (pivot bearing 6) at the bottom end of the rotary shaft 10, and hence even if the rotary shaft 10 is inclined with respect to a vertical line in a state of installation, there is no difference in a horizontal distance between the center of gravity G of the flywheel 3 and the rotational fulcrum. Since the precession of the flywheel 3 is generated due to the difference in a horizontal distance between the center of gravity G of the flywheel 3 and the rotational fulcrum at the bottom end of the rotary shaft 10 in a state in which the rotary shaft 10 is inclined with respect to a vertical line, if there is no difference in a horizontal distance, the precession is not generated.

Further, in the flywheel power source device 1 in accordance with the present invention, the line of action of the resultant force of magnetic attractive forces applied to the flywheel 3, when the flywheel 3 is rotated, coincides with the center lines X, Y of the iron cores 15, 17. Therefore, in theory, the resultant force of the magnetic attractive forces acts on the rotational fulcrum at the bottom end of the rotary shaft 10 and the center of gravity G of the flywheel 3, and irrespective of the magnitude of the magnetic attractive forces, moment inclining the flywheel 3 is not generated. Accordingly, even if the flywheel 3 in a stop state is started by large voltage, the flywheel 3 does not produce the precession.

Up to this point, while the present invention has been described with reference to the preferred embodiment, of course, it does not intended to limit the present invention to the preferred embodiment described above. For example, although the rotor 19 of the flywheel 3 is constituted by the iron core 17 in the preferred embodiment, the present invention can be applied to a well-known conventional power source device in which the iron core 17 is replaced with a permanent magnet (for example, Japanese Patent Application Unexamined Publication No. SHO 60 (1985)-141144).

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A flywheel power source device for converting electric energy into kinetic energy, for storing kinetic energy, and for reconverting kinetic energy into electric energy when necessary, comprising:

a casing;

a flywheel configured to rotate at a selected speed within said casing;

a rotary shaft for supporting said flywheel;

a bearing mounted in said casing and rotatably supporting said rotary shaft; and a rotational fulcrum at a bottom end of said rotary shaft;

wherein said flywheel has a center of gravity positioned on a line of action of a resultant force of magnetic attractive forces acting on said flywheel, said line of action acting on said rotational fulcrum at said bottom end of said rotary shaft.

2. A flywheel power source device as claimed in claim 1, wherein said line of action of a resultant force of magnetic attractive forces acting on said flywheel coincides with a center line of a rotatable iron core mounted on a side of said flywheel and a center line of static iron core mounted on a side of said casing.

3. The flywheel power source device according to claim 1, wherein a center line of a rotatable iron core mounted on a side of said flywheel is aligned with a center line of a static iron core mounted on a side of said casing, and said rotational fulcrum of said rotary shaft and said center of gravity of said flywheel are positioned on said center lines of said iron cores.

4. A flywheel power source device as claimed in claim 1, further comprising a touch-down bearing of an outer-ring-rotating type having a plurality of ball bearings operable to separate a circular recessed portion of said flywheel from said plurality of ball bearings.

* * * * *

UNITED STATES PATENT AND TRADEMARK OFFICE
CERTIFICATE OF CORRECTION

PATENT NO. : 6,172,435
DATED : January 9, 2001
INVENTOR(S) : Kazuhiko TANAKA

It is certified that error appears in the above-identified patent and that said Letters Patent is hereby corrected as shown below:

Title page item [73], change Assignee name from "Hoile" to --Hoiile--.

Signed and Sealed this

Twenty-second Day of May, 2001

Attest:

NICHOLAS P. GODICI

Attesting Officer

Acting Director of the United States Patent and Trademark Office